May 30, 1967 MAKOTO HIDA ET AL 3,322,063

LINE PRINTER CONTROL CIRCUIT

Filed May 11, 1965 4 Sheets-Sheet 1

May 30, 1967 MAKOTO HIDA ETAL 3,322,063

LINE PRINTER CONTROL CIRCUIT

Filed May 11, 1965 4 Sheets-Sheet 2

May 30, 1967 MAKOTO HIDA ETAL 3,322,063

LINE PRINTER CONTROL CIRCUIT

Filed May 11, 1965 4 Sheets-Sheet 4

United States Patent Office 3,322,063

Patented May 30, 1967

3,322,063

LINE PRINTER CONTROL CIRCUIT

Makoto Hida, Yokohama-shi, Atsuo Tanaka, Fujisawa-shi, and Toshiyuki Hatanaka, Kawasaki-shi, Japan, assignors to Fujitsu Limited, Kawasaki, Japan, a corporation of Japan Filed May 11, 1965, Ser. No. 455,671
Claims priority, application Japan, May 14, 1964, 39/27,124
8 Claims. (Cl. 101—93)

The present invention relates to a line printer control circuit. More particularly, the invention relates to a control circuit for controlling the operation of a line printer of a type utilized with computers.

The principal object of the present invention is to provide a new and improved line printed control circuit An object of the present invention is to provide a line printer control circuit which provides rapid line printing.

Another object of the present invention is to provide a line printer control circuit which saves printing time.

In accordance with the present invention, a control circuit for a line printer functions to halt the printing operation at the end of the printing of the predetermined number of characters of the data to be printed. This avoids the necessity for scanning through character positions of characters which are not included in the data to be printed and thus saves the time which would be required for such additional scanning.

For the purposes of the present invention, a character is defined as any printed unit such as a digit or number, an alphabetic letter, or a punctuation or other symbol.

In order that the present invention may be readily carried into effect, it will now be described with reference to the accompanying drawings, wherein.

Figure 4:
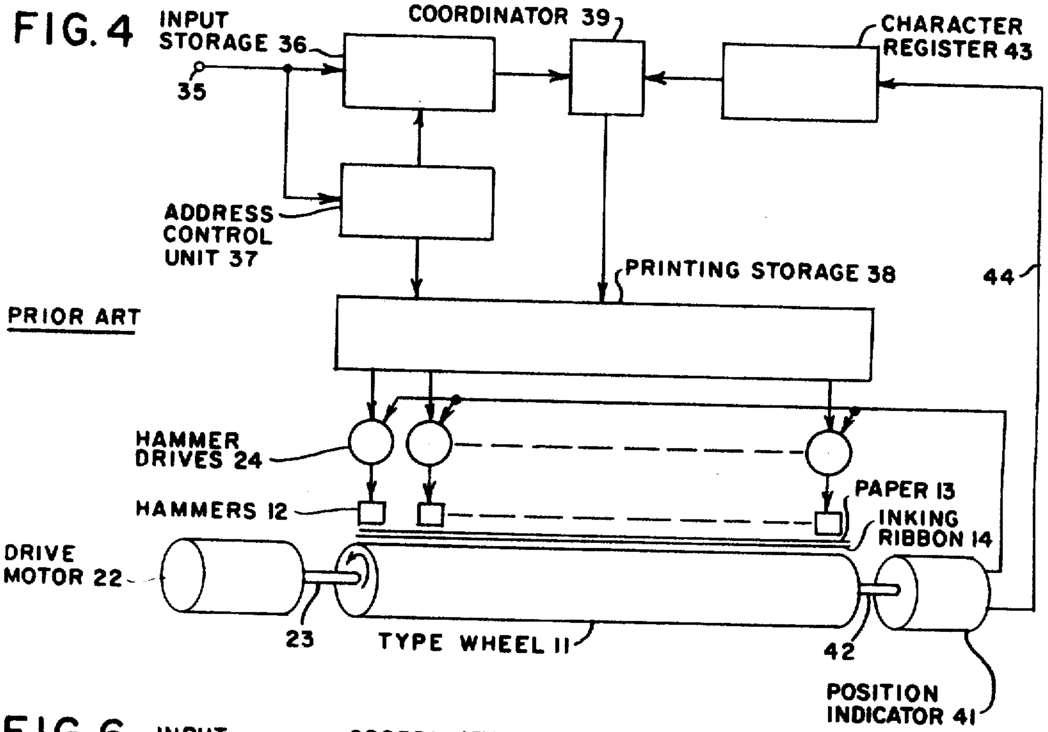
FIG. 4 is a circuit diagram, in block form, of an embodiment of a line printer control circuit of known type.
Figure 6:
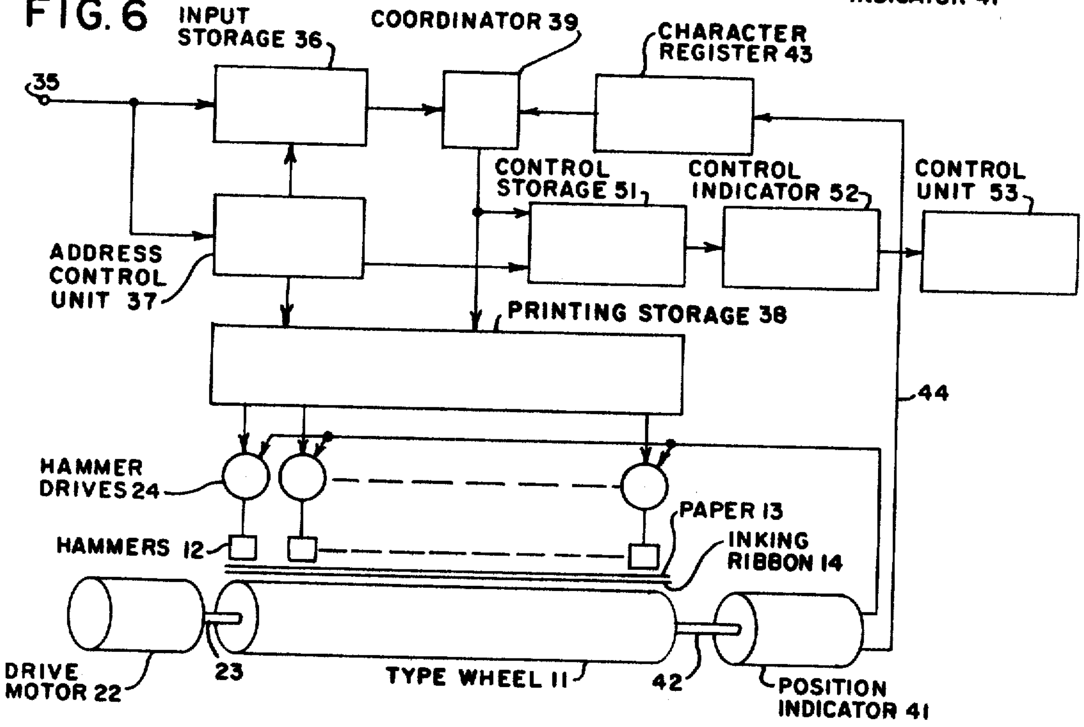
Figure 5A:
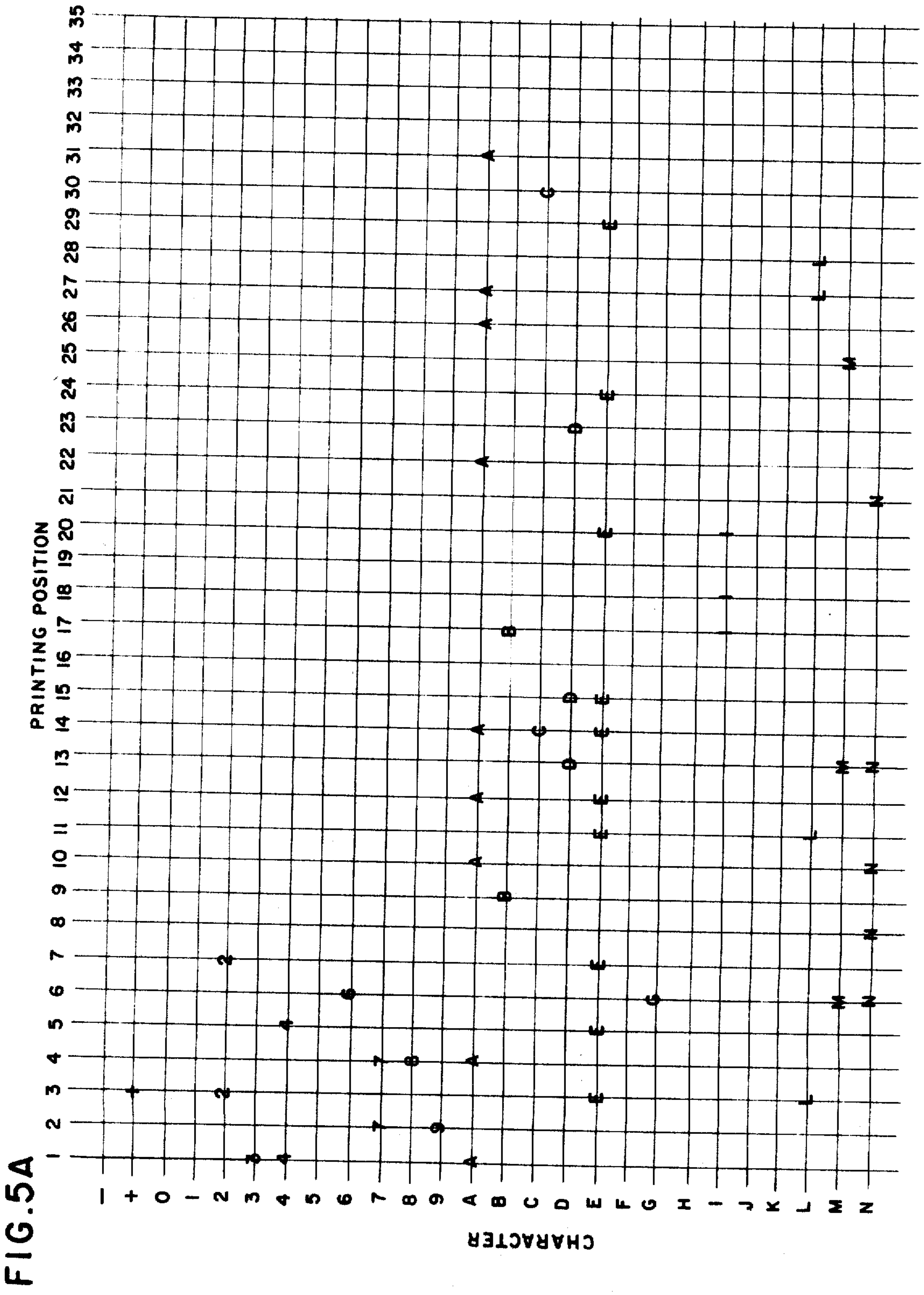
Figure 5B:
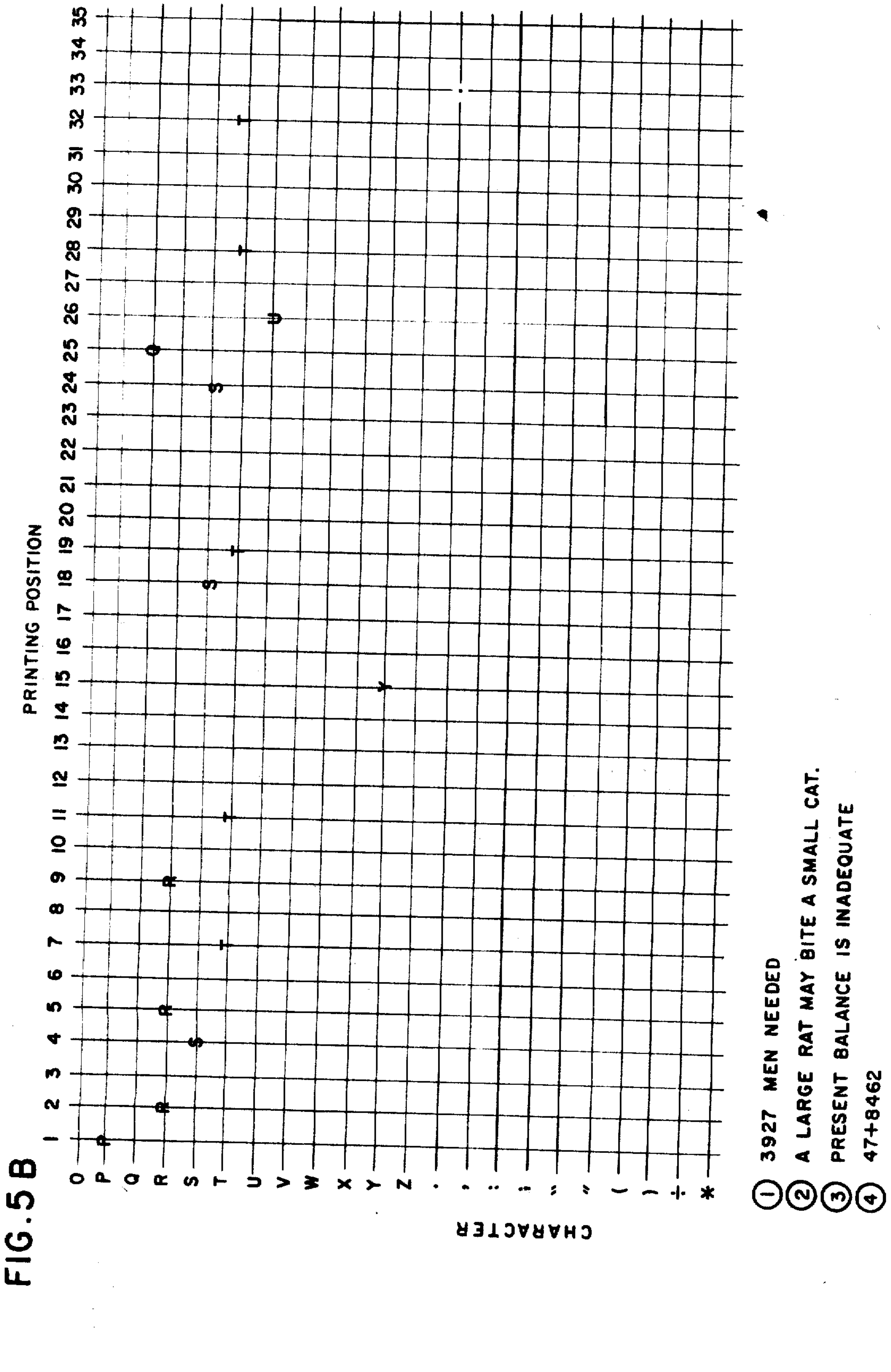

FIGS. 5A and 5B together are a tabular presentation of the printing operation of a line printer of known type under the control of the control circuit of FIG. 4; and FIG. 6 is a circuit diagram, in block form, of an embodiment of the line printer control circuit of the present invention.

In the figures, the same components are identified by the same reference numbers.

In the figures, the type wheel 11 is a cylinder having a cylindrical type-bearing surface. The type-bearing surface comprises a plurality of laterally or longitudinally extending type lines. Each type line has a specific digit, alphabetic character, or punctuation or other symbolic indication recorded therein exclusively. Thus, for example, in known type wheels, a laterally or longitudinally extending line comprising only the character A is provided on the type whel and is next succeeded by a longitudinally extending line including only the letter B. This continues for the entire alphabet.

The number of characters, repeated in each line, depends upon the length of the line to be printed by the line printer. Thus, for example, if the line printer is to print a thirty-five space line, there will be thirty-five A's in the A line, thirty-five B's in the B line, thirty-five C's in the C line, thirty five D's in the D line, and so on, as well as thirty-five zeros in the zero line, thirty-five 1's in the 1-line, thirty-five 2's in the 2 line, and so on.

Figure 2:
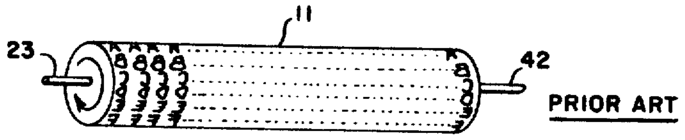
FIG. 2 is a perspective view of a type wheel of known type.
Figure 3:
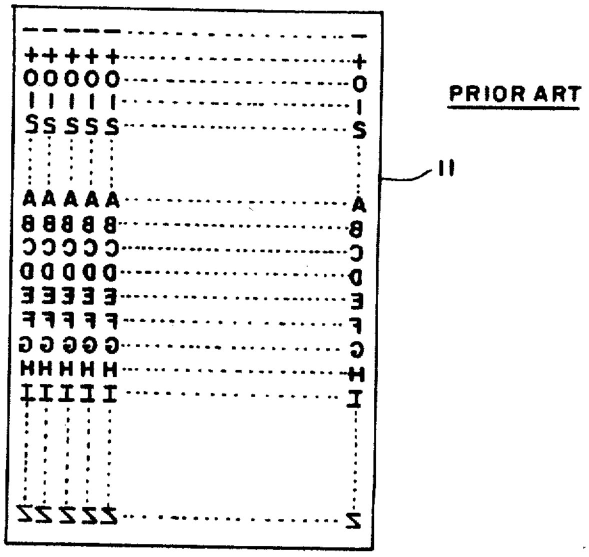
FIG. 3 is a developed view of the type surface of a type wheel of known type which is modified in accordance with the present invention.

The usual type of type wheel 11 is shown in FIG. 2. In FIG. 3, which is a developed view of the type wheel 11, the arrangement of the letter characters and digit characters is shown modified in accordance with the present invention. Thus, the first laterally extending line comprises, for example, thirty-five minus signs, the next succeeding laterally extending line comprises, for example, thirty-five plus signs, the next succeeding lateral line comprises thirty-five zeros, the next succeeding lateral line comprises, for example, thirty-five 1's, and so on through the lateral line comprising thirty-five 9's. The lateral line comprising thirty-five A's, and so on, through thirty-five Z's following in succession, and then thirty-five each of the various symbols follow in the next succeeding lines.

The arrangement of characters on the type wheel is further illustrated in FIGS. 5A and 5B, wherein the characters are indicated in the vertical column at the left of FIGS. 5A and 5B as comprising, in horizontally extending lines, which are successively positioned in sequence, a minus sign, a plus sign, a zero, 1, 2, 3, 4, 5, 6, 7, 8, 9, A, B, C, D, E, F, G, H, I, J, K, L, M, N, O, P, Q, R, S, T, U, V, W, X, Y, Z, period, comma, semicolon, open quote, close quote, open parenthesis, close parenthesis, a division sign, an asterisk, an any other number of symbols (not shown).

For the purposes of illustration, it is assumed that each line to be printed has thirty-five spaces. Thus, any data which may be printed in thirty-five spaces, may be printed by the line printer illustrated in the figures. Thus, for example, in FIGS. 5A and 5B, the printing positions are indicated in the horizontal row at the top of the figure so that each of the thirty-five printing positions is set forth in vertically extending lines. Thus, for example, if the data comprises thirty-five repetitions of each different symbol and character which may be printed, the illustration of FIGS. 5A and 5B would indicate thirty-five minus signs, one in each of the thirty-five printing positions, thirty-five plus signs, one in each of the thirty-five printing positions, and so on, until the thirty-five asterisks.

Figure 1:
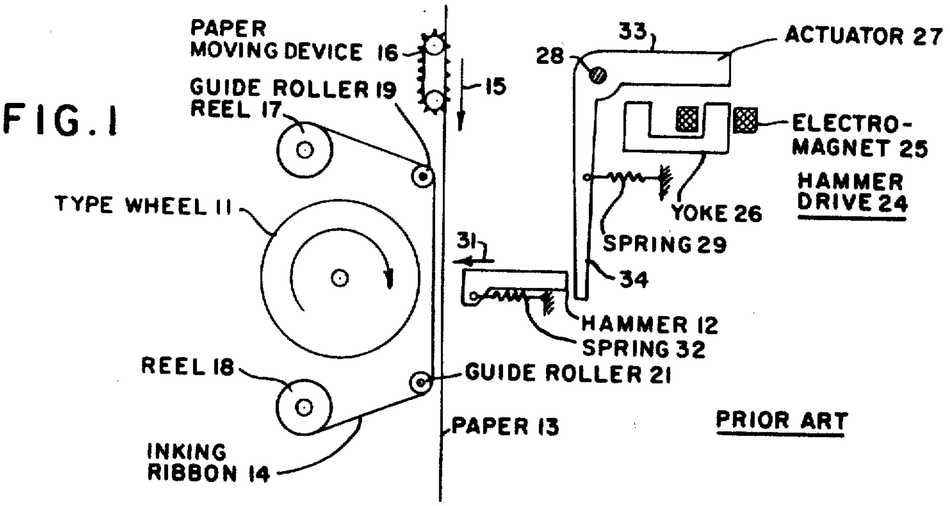
FIG. 1 is a schematic side view of an embodiment of a line printer of known type.

The line printer of FIG. 1 comprises, besides the type wheel 11, a plurality of hammers 12, of which only one is shown, paper 13 and inking ribbon 14. The paper 13 and the inking ribbon 14 are positioned between the type wheel 11 and the hammers 12. The inking ribbon 14 is positioned between the type wheel 11 and the paper 13. The paper 13 is moved in the direction of an arrow 15, for example, by any suitable moving means such as, for example, a paper moving device 16. The inking ribbon 14 is moved, in the manner of an inking ribbon of a typewriter, from one of a pair of reels 17 and 18 to the other of said pair of reels. The inking ribbon 14 is supported by guide rollers 19 and 21 positioned adjacent the paper 13 to enable the inking ribbon to be positioned in parallel with the paper between the type wheel and said paper.

The type wheel 11 is driven, for example, in clockwise direction, by any suitable driving means such as, for example, a drive motor 22, as shown in FIGS. 4 and 6, via any suitable means such as, for example, a drive shaft 23, as illustrated in FIGS. 2, 4 and 6. The drive motor 22 is preferably a stepping type motor, of a type known in the art, which moves the type wheel 11, incremently, through each of its character positions. That is, each character must be provided for in the rotation of the type wheel 11 so that the type wheel must move through positions which enable each of the characters to be printed in each line. Thus, in normal, known operation, the type wheel 11 moves through incremental steps, one step for each of the characters. That is, the type wheel 11 moves through a number of steps equal to the number of digital characters, alphabetic characters and symbol characters listed in FIGS. 5A and 5B, which characters appear on the type face of said type wheel, as indicated in FIG. 3.

The line printer of FIG. 1 further comprises a plurality of hammer drives 24, of which one is shown, and each of which includes an electromagnet 25, a yoke 26 and an actuator 27 which is pivotally mounted about a pivot pin 28. The actuator 27 is mounted for pivotal rotation about the pivot pin 28 and is returned to its inactive position by a return spring 29 suitably affixed to an extending portion thereof. Each hammer 12 is suitably mounted for movement in the direction of an arrow 31 and has a return spring 32 affixed thereto to return said hammer to its rest position.

In operation, when a line is to be printed, the drive motor 22 (not shown in FIG. 1) first moves the type wheel 11 to the character A. Selected ones of the electromagnets 25 are energized and magnetize corresponding yokes 26, which then attract the extending portion 33 of each of the corresponding actuators 27. Each of the selected actuators 27 thus moves pivotally about its pivot point 28 in a clockwise direction so that its extending portion 34 abuts the corresponding hammer 12 with sufficient impact to abruptly move said hammer in the direction of the arrow 31. The selected hammers 12 thus move toward the type wheel 11 and each of said hammers presses the paper 13 and the inking ribbon 14 between said type wheel and said hammer. Thus, if, in the first character position, A is to be printed in the first, third, fourth and seventeenth printing positions, such A is then printed in said printing positions.

In actuality, as indicated in FIGS. 4 and 6, the number of hammers 12 and hammer drives 24 including all of the described components thereof, is equal to the number of printing positions. Thus, in the illustrated example, there are thirty-five separate hammers 12 and thirty-five separate hammer drives 24 each including its corresponding actuator, yoke and electromagnet. The line printer of FIG. 1 functions in a known manner to produce a printed line under the control of a known control circuit of the type illustrated in FIG. 4.

In FIG. 4, the data to be printed is supplied to the control circuit via an input terminal 35. The data supplied to the input terminal 35 may be derived from a suitable component, not shown, which converts a binary or other code into the alphabetic and digital representations as they will actually be printed. Of course, the preliminary components, also not shown, may include various storages and other suitable circuitry and devices. The input signal is supplied to an input storage 36 and at the same time is supplied to an address control unit 37. The address control unit 37 is connected to the input storage 36 and is also connected to a printing storage 38, so that it controls the addressing or read-out of the input storage 36 and the printing storage 38.

The input storage 36 is connected to a coordinator 39 and functions to provide the signals to be printed by the line printer to said coordinator. The coordinator 39 is connected to the printing storage 38. A position indicator 41 is coupled to an output shaft 42 of the type wheel 11 and provides an output which is supplied to a character register 43 via a lead 44. The character register 43 is connected to the coordinator 39.

The position indicator 41 may comprise any suitable known means for supplying an indication of each character as it is positioned by the stepping of the type wheel 11. Thus, for example, the position indicator 41 indicates to the character register 43, which records signals from said position indicator, the position of the type wheel 11 when it is at each of the character positions from the minus sign, the plus sign, the A position, the B position, the C position, and so on through the asterisk position.

The information of the character position of the type wheel 11 is coordinated with the data to be printed, which is stored in the input storage 36, by the coordinator 39 and is then supplied to the printing storage 38 in coordinated condition, so that the various hammer drives 24 function to drive the selected hammers 12 of the selected printing positions. This operation is illustrated in detail in FIGS. 5A and 5B.

The operation of the line printer and the operation of the line printer control circuit are known as are the line printer and the line printer control circuit. The position indicator 41 may comprise, for example, a rotating device synchronously coupled to the type wheel 11. Each of the input storage 36, address control unit 37, printing storage 38 and character register 43, may comprise any suitable means known in the art for performing the desired function.

The line printer control circuit of FIG. 4 functions as illustrated in FIGS. 5A and 5B. It is assumed that the characters are arranged on the type wheel 11 in the order shown at the left of FIGS. 5A and 5B, so that the first symbol is a minus sign, the next symbol is a plus sign, the following characters are digits, the next following characters are alphabetic letters, and the last characters are punctuation symbols. Each character is provided thirty-five times in its laterally extending line on the type wheel 11.

The printing of each of four different example lines is illustrated and is hereinafter described in order to illustrate the operation of the line printer of FIG. 1 under the control of the line printer control circuit of FIG. 4. If, for example, it is desired to print the line -- 3927 men needed --, such line is printed in the following manner. In the first character or minus symbol position, nothing is printed and the type wheel 11 is stepped to the next character or plus symbol position. Nothing is printed in this character position. The next step to which the type wheel is stepped is the zero character position, in which nothing is printed.

The 1 character position follows, to which the type wheel 11 is stepped by the drive motor 22. Nothing is printed in the 1 character position. Then, the type wheel 11 is stepped to its 2 character position. In the 2 character position, the character 2 is printed in the third printing position by the third hammer drive 24 and the third hammer 12. That is, when the 2 character is in printing position, only the number 3 printing position hammer 12 is actuated and prints a 2 in the number 3 printing position.

The type wheel 11 is then stepped by the drive motor 22 to the 3 character position, wherein the first hammer 12 is actuated to print the character 3 in the first printing position. The type wheel 11 is then stepped through the 4, 5 and 6 character positions without printing, and then, when it is stepped to its 7 character position, the fourth hammer 12 is actuated to print the character 7 in the fourth printing position. The type wheel 11 is then stepped to its 8 character position, in which nothing is printed, and then, when the type wheel is stepped to its 9 character position, the second hammer is actuated and prints the character 9 in the second printing position, so that the complete number 3927 is then printed in the first, second, third and fourth printing positions.

The A, B and C character positions are then scanned in succession, and none of these characters are printed. Then, when the type wheel 11 is stepped to the D character position, the thirteenth and fifteenth hammers 12 are actuated and print a D in each of the thirteenth and fifteenth printing positions. The type wheel 11 is then stepped to the E character position, and the seventh, eleventh, twelfth and fourteenth hammers are actuated and print an E in each of the seventh, eleventh, twelfth and fourteenth printing positions.

The F, G, H, I, J, K, and L character positions are then scanned and none of these characters are printed. The type wheel 11 is then stepped to the M character position and the sixth hammer 12 is actuated and prints an M in the sixth printing position. The type wheel 11 is then stepped to the N character position, and the eighth and tenth hammers 12 are actuated and print an N in each of the eighth and tenth printing positions.

In the line printer, and under the control of the control circuit of FIG. 4, the remaining character positions are then scanned and none of these characters are printed, since the entire line has then been completely printed. The line thus printed as a single line of the paper 13 is -- 3927 men needed --. The time for the printing, however, is the time that it takes for the line printer of FIG. 1 to scan all the character positions, digital, alphabetic and symbolic.

In a second illustration of the operation of the line printer control circuit of FIG. 4, the line to be printed is -- A LARGE RAT MAY BITE A SMALL CAT. --. The minis and plus sign character lines are scanned, and the digital character lines zero through 9 are scanned, and none of these characters are printed. The type wheel 11 is then stepped to the A character position and the first, fourth, tenth, fourteenth, twenty-second, twenty-sixth and thirty-first hammers 12 are actuated and print an A in each of the first, fourth, tenth, fourteenth, twenty-second, twenty-sixth and thirty-first printing positions.

The type wheel 11 is then stepped through each of the B through Z character positions and through each of the punctuation symbol character positions, so that the remaining letters of the line are printed in the manner illustrated and the line is ended by a period printed in the thirty-third printing position. The third example line -- PRESENT BALANCE IS INADEQUATE -- is printed in a similar manner to the printing of the two previous example lines illustrated, and is also illustrated in FIGS. 5A and 5B. In each of the three examples, as in every line printing operation of the known type of line printer, every character position is scanned during the printing operation and the time for printing is the time that it takes for scanning the total of all the character positions.

The actual printing is all achieved in a single line. Thus, in the case of the third example, for example, the entire line is printed as a single line with the characters which it comprises printed in their proper positions in character printing sequence. In the character position scannings for the minus and plus symbols and the digital characters 0 to 9, nothing is printed. Then, in the successive A, B, C, D, E, I, L, N, P, Q, R, S and T character positions the A's, B's, C's, D's, E's, I's, L's, N's, P's, Q's, R's, S's and T's are printed in their appropriate selected positions. In the F, G, H, J, K, M, O, U, V, W, X, Y and Z character positions, nothing is printed.

The line, as it is actually printed, thus first appears as

```
         A A         A    A
```

Then, upon completion of scanning of the B character position, the line is printed as

```
        BA A         A    A
```

The line is then completed, step by step, as each different character is scanned and printed in its proper positions.

```
        BA A C       A    A
        BA A C       AD   A
  E E   BA A CE      ADE  A E
  E E   BA A CE I  I ADE  A E
  E E   BALA CE I  I ADE  A E
  E EN  BALANCE I  INADE  A E
P E EN  BALANCE I  INADEQ A E
P E EN  BALANCE I  INADEQ A E
 RE EN  BALANCE I  INADEQ A E
PRESEN  BALANCE IS INADEQ A E
PRESENT BALANCE IS INADEQ ATE
PRESENT BALANCE IS INADEQUATE
```

A fourth example of the operation of the line printer under the control of the control circuit of FIG. 4 illustrates the longest unproductive or wasted time taken for printing, since it comprises the printing of only digital characters or numbers. It is assumed, for the purposes of the present invention, that the digital character positions are arranged on the type wheel 11 as shown in FIG. 3, and as illustrated in FIGS. 5A and 5B, prior to the alphabetic character positions.

The fourth example is -- 47+8462 --. This is printed in the manner illustrated, and the end result is the line -- 47+8462 --. However, although the actual printing time is only the time that it takes to scan the minus sign plus sign, zero, 1, 2, 3, 4, 5, 6, 7 and 8 character positions, the actual time that the line printer takes for the printing operation is the time that it takes for scanning all the character positions, including the letter positions and the punctuation symbol positions, although none of these characters are included in the line which is printed.

In FIG. 4, the output of the position indicator 41 is also connected to each of the thirty-five hammer drives 24. It is thus seen that considerable printing time is actually unused or wasted in the usual control circuit for the line printer, especially when only digits are to be printed. It is a usual or typical situation when only digits are to be printed, especially in line printers utilized with computers, so that the problem of printing time becomes an important one.

In accordance with the present invention, the control circuit for the line printer is that shown in FIG. 6 The line printer control circuit of the present invention, as shown in FIG. 6, is a modification of the control circuit of FIG. 4. The control circuit of FIG. 6 includes three additional units or components and these additional components control the operation of the line printer in the following manner to save the otherwise wasted printing time.

The control circuit of the present invention, as illustrated in FIG. 6, is essentially that of FIG. 4, with the addition of the components mentioned. In the control circuit of FIG. 6, a control storage 51 is connected to the common connection between the coordinator 39 and the printing storage 38 and is also connected to the output of the address control unit 37. The output of the control storage 51 is connected to a control indicator 52, which in turn is connected to a control unit 53.

The control storage 51 stores the coordinated information fed to the printing storage 38 by the coordinator 39 and also stores the address control information from the address control unit 37. The control storage 51 thus stores a complete record of the data of the line to be printed. The data to be printed which is stored in the control storage 51 is supplied to a control indicator 52 which indicates the end of the data of the line to be printed. The control storage 51 may comprise any suitable storage known and the control indicator 52 may comprise any suitable means for indicating the end of a line.

The end of each line to be printed may, for example, be marked with an asterisk, and the control indicator 52 may comprise suitable responsive circuitry which responds to an asterisk and which produces an output signal in so responding thereto. The control indicator 52 thus provides a signal which indicates that the end of the line to be printed has been reached.

In the illustrated first example, when the complete line -- 3927 men needed -- has been printed, the control indicator 52 produces a signal which indicates that the last character, N, in this case, has been printed and that the printing of the line is completed. In the illustrated second example, when the character T has been printed, the control indicator 52 provides a signal which indicates that the line has been printed. In the third example, the same situation is evident. That is, after the T's have been printed, the control indicator 52 will provide a signal indicating that the complete line has been printed. In the fourth illustrated example, after the digital character 8 has been printed, the control indicator 52 will provide a signal indicating that the complete line has been printed.

The signal indicating the end of the printing of the line is supplied from the control indicator 52 to the control unit 53 which serves to halt the printing process and to return the line printer to its initial condition in readiness for the next line to be printed. That is, the control unit 53 may comprise any suitable means for halting the printing operation and returning the line printer to its initial position. Thus, in the first example, for example, after the character N has been printed, the printing operation is halted and the type wheel 11 is returned to its starting or minus sign character position. In the second illustrated example, and again in the third example, after the character T has been printed in its various printing positions, the signal provided by the control indicator 52 and fed to the control unit 53 will stop the further stepping of the type wheel 11 and will cause the type wheel 11 to be moved directly to its minus sign character position in readiness for the printing of the next line.

The greatest amount of time is saved, in accordance with the present invention, when the line to be printed includes only digital characters, such as illustrated in the fourth example. In this third example, after the digital character 8 has been printed, the control indicator 52 will provide a signal which will operate the control 53 to halt further printing and to energize the drive motor 22 to step the type wheel 11 back to its minus sign character position.

The control unit 53 may comprise, for example, a direct control of the drive motor 22 and/or any suitable arrangement for controlling the rotation of such drive motor or the rotation of the type wheel 11. The control storage 51 and the control indicator 52 may comprise any suitable counting system which functions to count the number of characters to be printed in the line and which indicates the completion of the printing of the appropriate number of characters. Thus, in the first example, thirteen characters are printed in the line with two spaces provided between words. In this case, after characters have been printed in thirteen character places, the control indicator 52 produces a signal which actuates the control unit 53 to halt further printing and to return the type wheel 11 to its initial character position.

The control storage 51 may comprise a reconversion unit which converts the data back into binary form, so that each character is indicated as either a signal or a no signal. As each character is actually printed by the corresponding selected hammer or hammers 12, the control indicator 52 may then convert each signal to a no signal or each no signal to a signal. Thus, when all the signals have been converted from their initial state to their ultimate state, which is the direct opposite of their initial state, the control indicator 52 would then produce a signal indicating that the end of the line has been printed, that is, that the entire line has been printed. In this case, as each no signal is converted to a signal and as each signal is converted to a no signal, such conversion may be accomplished in the control storage 51 or in the control indicator 52.

The line printer control circuit of the present invention, as illustrated in FIG. 6, thus provides a considerable saving in the line printing time, and is a considerable improvement over known line printers and line printer control circuits, since the actual line printing time is the total line printing time in the control circuit of the present invention.

While the invention has been described by means of specific examples and in a specific embodiment, we do not wish to be limited thereto, for obvious modifications will occur to those skilled in the art without departing from the spirit and scope of the invention.

We claim:

1. In line printing apparatus comprising a type wheel, hammer means, paper and inking means interposed between said type wheel and said hammer means and driving means coupled to said type wheel for rotating said type wheel incrementally from an initial position, a line printer control circuit for controlling the operation of said line printing apparatus to print a line of data having a determined number of characters from said initial position of said line printing apparatus, said line printer control circuit comprising,
   - control indicating means for indicating by binary means the completion of printing of said determined number of characters; and
   - control means connected to said control indicating means and coupled to the driving means said line printing apparatus for halting the operation of said line printing apparatus upon the completion of printing of said determined number of characters and directly returning the type wheel of said line printing apparatus to its initial position.

2. In line printing apparatus comprising a type wheel, hammer means, paper and inking means interposed between said type wheel and said hammer means and driving means coupled to said type wheel for rotating said type wheel incrementally from an initial position, a line printer control circuit for controlling the operation of said line printing apparatus to print a line of data having a determined number of characters from said initial position of said line printing apparatus, said line printer control circuit comprising printing storage means for storing data to be printed by said line printing apparatus and coordinator means for supplying to said printing storage means data to be printed coordinated with the printing positions of the characters of said data,
   - control indicating by binary means means for indicating the completion of printing of said determined number of characters;
   - coupling means coupling said control indicating means to a common connection between said coordinator means and said control means; and
   - control means connected to said control indicating means and coupled to the driving means said line printing apparatus for halting the operation of said line printing apparatus upon the completion of printing of said determined number of characters and directly returning the type wheel of said line printing apparatus to its initial position.

3. In line printing apparatus comprising a type wheel, hammer means, paper and inking means interposed between said type wheel and said hammer means and driving means coupled to said type wheel for rotating said type wheel incrementally from an initial position, a line printer control circuit for controlling the operation of said line printing apparatus to print a line of data having a determined number of characters from said initial position of said line printing apparatus, said line printer control circuit comprising printing storage means for storng data to be printed by said line printing apparatus and cooridnator means for supplying to said printing storage means data to be printed coordinated with the printing positions of the characters of said data,
   - control indicating means for indicating by binary means the completion of printing of said determined number of characters;
   - control storage means coupling said control indicating means to a common connection between said coordinator means and said control means, said control storage means storing said data to be printed coordinated with the printing positions of the characters of said data; and
   - control means connected to said control indicating means and coupled to the driving means said line printing apparatus for halting the operation of said line printing apparatus upon the completion of printing of said determined number of characters and directly returning the type wheel of said line printing apparatus to its initial position.

4. In line printing apparatus comprising a type wheel, hammer means, paper and inking means interposed between said type wheel and said hammer means and driving means coupled to said type wheel for rotating said type wheel incrementally from an initial position, a line printer control circuit for controlling the operation of said line printing apparatus to print a line of data having a determined number of characters from said initial position of said line printing apparatus, said line printer control circuit comprising printing storage means for storing data to be printed by said line printing apparatus and coordinator means for supplying to said printing storage means data to be printed coordinated with the printing positions of the characters of said data, control indicating means for indicating by binary means the completion of printing of said determined number of characters, said control indicating means including counter means;

control storage means coupling said control indicating means to a common connection between said coordinator means and said control means, said control storage means storing said data to be printed coordinated with the printing positions of the characters of said data; and control means connected to said control indicating means and coupled to the driving means said line printing apparatus for halting the operation of said line printing apparatus upon the completion of printing of said determined number of characters and directly returning the type wheel of said line printing apparatus to its initial position.

5. In line printing apparatus comprising a type wheel, hammer means, paper and inking means interposed between said type wheel and said hammer means and driving means coupled to said type wheel for rotating said type wheel incrementally from an initial position, a line printer control circuit for controlling the operation of said line printing apparatus to print a line of data having a determined number of characters from said initial position of said line printing apparatus, said line printer control circuit comprising printing storage means for storing data to be printed by said line printing apparatus and coordinator means for supplying to said printing storage means data to be printed coordinated with the printing positions of the characters of said data, control indicating means for indicating by binary signals the completion of printing of said determined number of characters, said control indicating means including counter means;

control storage means coupling said control indicating means to a common connection between said coordinator means and said control means, said control storage means storing said data to be printed coordinated with the printing positions of the characters of said data, each of said characters being stored as the same signal in said control storage means; and control means connected to said control indicating means and coupled to the driving means said line printing apparatus for halting the operation of said line printing apparatus upon the completion of printing of said determined number of characters and directly returning the type wheel of said line printing apparatus to its initial position.

6. In line printing apparatus comprising a type wheel, hammer means, paper and inking means interposed between said type wheel and said hammer means and driving means coupled to said type wheel for rotating said type wheel incrementally from an initial position, a line printer control circuit for control-line the operation of said line printing apparatus to print a line of data having a determined number of characters from said initial position of said line printing apparatus, said line printer control circuit comprising printing storage means for storing data to be printed by said line printing apparatus and coordinator means for supplying to said printing storage means data to be printed coordinated with the printing positions of the characters of said data, control indicating means for indicating by binary signals the completion of printing of said determined number of characters, said control indicating means including counter means;

control storage means coupling said control indicating means to a common connection between said coordinator means and said control means, said control storage means storing said data to be printed coordinated with the printing positions of the characters of said data, each of said characters being stored as the same binary signal in said control storage means and being inverted to the opposite binary signal after it is counted by the counter means of said control indicating means; and control means connected to said control indicating means and coupled to the driving means said line printing apparatus for halting the operation of said line printing apparatus upon the completion of printing of said determined number of characters and directly returning the type wheel of said line printing apparatus to its initial position.

7. In line printing apparatus as claimed in claim 6, wherein each of said characters is stored in said control storage means as a binary 0 and is inverted to a binary 1 after it is counted by the counter means of said control indicating means.

8. In line printing apparatus as claimed in claim 7, wherein said control indicating means actuates said control means when all the signals stored in said control storage means are binary 1.

References Cited

UNITED STATES PATENTS

| | | | |
|---|---|---|---|
| 2,800,073 | 7/1957 | Block | 101—93 |
| 2,850,566 | 9/1958 | Nelson | 178—23 |
| 2,874,633 | 2/1959 | Goldbert et al. | 101—93 |
| 2,915,966 | 12/1959 | Jacoby | 101—93 |
| 2,915,967 | 12/1959 | Gehring et al. | 101—93 |
| 3,193,802 | 7/1965 | Deerfield | 340—172.5 |
| 3,229,626 | 1/1966 | Arps | 101—93 |
| 3,247,788 | 4/1966 | Wilkins et al. | 101—93 |

WILLIAM B. PENN, *Primary Examiner.*